United States Patent
Mueller et al.

(10) Patent No.: US 11,366,135 B2
(45) Date of Patent: Jun. 21, 2022

(54) GNSS STATISTICALLY DERIVED ABS SPEEDOMETER CALIBRATION

(71) Applicant: Ford Global Technologies, LLC, Dearborn, MI (US)

(72) Inventors: Paul Anthon Mueller, St. Clair Shores, MI (US); Gregory William Farrey, Ypsilanti, MI (US); David A. Herman, Southfield, MI (US); Christopher Henderson, Belleville, MI (US); Boris Gorovets, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 963 days.

(21) Appl. No.: 15/491,841

(22) Filed: Apr. 19, 2017

(65) Prior Publication Data
US 2018/0306836 A1     Oct. 25, 2018

(51) Int. Cl.
*G01P 21/02*     (2006.01)
*G01P 7/00*      (2006.01)

(52) U.S. Cl.
CPC ............... *G01P 21/02* (2013.01); *G01P 7/00* (2013.01)

(58) Field of Classification Search
CPC ..................................................... G01P 21/02
See application file for complete search history.

(56) References Cited

U.S. PATENT DOCUMENTS

| 5,828,585 | A | 10/1998 | Welk et al. |
| 6,087,965 | A | 7/2000 | Murphy |
| 6,360,165 | B1 | 3/2002 | Chowdhary |
| 6,426,694 | B1 | 7/2002 | Larson |
| 2004/0167692 | A1 | 8/2004 | Brown |
| 2009/0326733 | A1* | 12/2009 | Abele ............... B60T 8/172 701/1 |
| 2010/0262396 | A1 | 11/2010 | Kircher |
| 2013/0289874 | A1* | 10/2013 | Taguchi ............ B60W 30/146 701/533 |

FOREIGN PATENT DOCUMENTS

| CN | 1955639 A | 5/2007 |
| CN | 105824039 A | 8/2016 |
| EP | 2600161 A1 | 6/2013 |
| GB | 2497087 A | 6/2013 |

OTHER PUBLICATIONS

"Ratio of Circumference to Diameter." Elementary Trigonometry. Second Edition, Revised and Enlarged., by James Hamblin. SMITH, Rivingtons, 1870, pp. 7-7. (Year: 1870).*
Kreyszig (Advanced Engineering Mathematics Sixth Edition, John Wiley & Sons, 1988) (Year: 1988).*
Search Report dated Sep. 25, 2018 for Great Britain Patent Application No. 1806304.0. (3 Pages).

* cited by examiner

*Primary Examiner* — John E Breene
*Assistant Examiner* — Jeffrey C Morgan
(74) *Attorney, Agent, or Firm* — Frank Lollo; Eversheds Sutherland (US) LLP

(57) ABSTRACT

Method and apparatus are disclosed for GNSS statistical speed calibration An example vehicle includes a wheel, a speed sensor for determining a first vehicle speed, an inertial sensor, and a processor. The processor may be configured for determining a second vehicle speed based on information from the inertial sensor and information from a satellite based system, determining that a difference between the first and second vehicle speeds is statistically significant, and responsively adjusting a value of the radius of the wheel.

16 Claims, 4 Drawing Sheets

GNSS STATISTICALLY DERIVED ABS SPEEDOMETER CALIBRATION

TECHNICAL FIELD

The present disclosure generally relates to measurement accuracy of a vehicle speed and, more specifically, Global Navigation Satellite System (GNSS) statistically derived anti-lock brake system (ABS) speedometer calibration.

BACKGROUND

Modern vehicles indicate the speed of the vehicle to within a predetermined accuracy threshold. This threshold may be a few percent different from actual speed, and may be the result of extrapolation of the vehicle speed based on indirect sensor measurements. The indicated speed may be used by many systems of the vehicle, such as indicating miles-to-empty, indicating fuel efficiency (miles-per-gallon), and many others.

GNSS measurements include the use of satellite technology to determine characteristics of a vehicle such as speed and location. These systems incorporate the use of sight lines in order to operate, and as such are less effective in areas with tall buildings or with impeded views of the sky. Further, these systems may have spotty or incomplete coverage of a given area, and therefore may not be robust in providing the speed of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for GNSS statistically derived ABS speedometer calibration. An example disclosed vehicle includes a wheel, a speed sensor for determining a first vehicle speed, an inertial sensor, and a processor. The processor may be configured for determining a second vehicle speed based on information from the inertial sensor and information from a satellite based system. The processor may also be configured for determining that a difference between the first and second vehicle speeds is statistically significant, and responsively adjusting a value of the radius of the wheel.

An example disclosed method for increasing accuracy of the measurement of a vehicle speed includes determining a first vehicle speed using a speed sensor. The method also include determining a second vehicle speed using an inertial sensor and a satellite based system. The method further includes determining that a difference between the first and second vehicle speeds is statistically significant. And the method yet further includes responsively adjusting a value of the radius of a wheel of the vehicle.

Another example may include means for determining a first vehicle speed using a speed sensor, means for determining a second vehicle speed using an inertial sensor and a satellite based system, means for determining that a difference between the first and second vehicle speeds is statistically significant, and means for responsively adjusting a value of the radius of a wheel of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
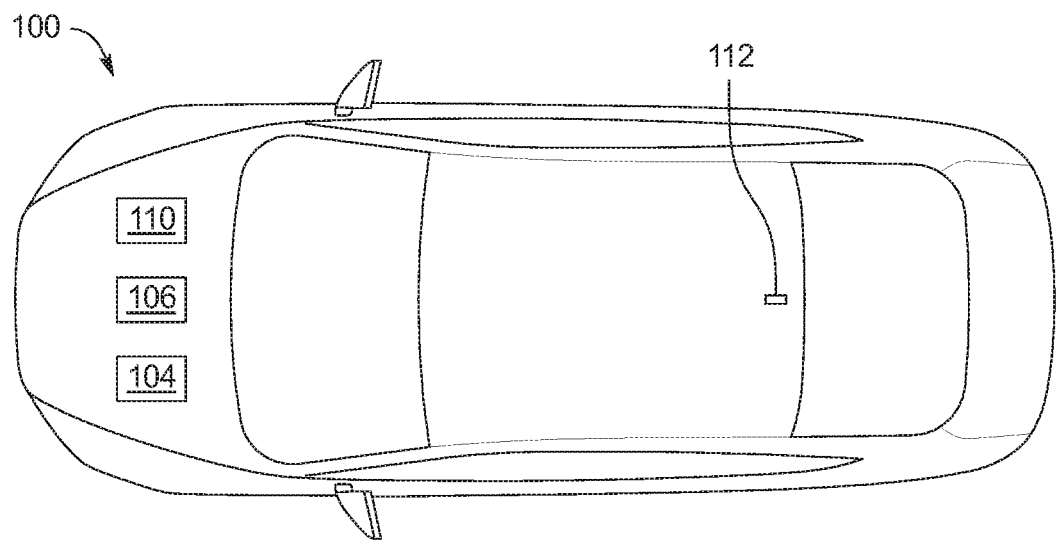
FIG. 1A illustrates an example top view of a vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Modern vehicles may indicate the speed of the vehicle to within a predetermined accuracy threshold. This threshold may be a few percent different from actual speed, and may be the result of extrapolation of the vehicle speed based on indirect sensor measurements. For instance, a visual sensor may be used to measure the number of rotations of a wheel, and the number of rotations per time period may then be used as a variable in an equation including the radius or circumference of the wheel and/or the time between wheel rotations, in order to arrive at a calculated speed. One or more of these values may be used by many systems of the vehicle, such as indicating miles-to-empty, indicating fuel efficiency (miles-per-gallon), or for many other uses.

Wheel based vehicle speed systems may have inherent errors introduced by manufacturing variations, temperature, and dynamic properties of the tires. Typical vehicle speed accuracy may therefore be within some percentage of actual speed. Errors may propagate to other systems, and may result in measurements of distance that are off by some percentage as well. Some applications may require more accurate measurement. For instance, rental vehicles that charge customers by the distance traveled may wish to have more accurate measurement. Further, with the increasing prevalence of autonomous or self driving vehicles, accuracy of measurement may impact vehicle safety, and may be essential to manufacturers looking to provide robust, safe vehicles.

GNSS measurements (such as GPS) may include the use of satellite technology to determine characteristics of a vehicle such as speed and location. In some examples, a GPS receiver associated with a vehicle may determine the position of the vehicle at several different moments in time, and use the resulting locations and times to determine a speed of the vehicle. GNSS measurements may have the benefit of long-term absolute accuracy over time, and may be immune from or resistant to drift.

However, GNSS systems may incorporate the use of sight lines in order to operate, for instance by direct line-of-sight between the GPS receiver and the satellites. As such, GNSS measurements may be less effective in areas with tall buildings or with impeded views of the sky, or in areas without extensive satellite coverage. There may also be problems from interference, scattering, and signal attenuation or degradation.

To counter the lack of robustness in GNSS systems, example embodiments described herein may include combining GNSS information with information from one or more inertial sensors integrated with the vehicle. For instance, the vehicle may have one or more gyroscopes, accelerometers, torque sensors, yaw and pitch sensors, or other sensors configured to detect one or more inertial values of the vehicle. These inertial sensors may have good short term accuracy, but may suffer from drift and noise which may cause measurement accuracy to degrade over time.

In order to increase the measurement accuracy of the speed of a vehicle, embodiments may include using both the measurement of vehicle speed via the vehicle speed sensor, as well as measurement of the vehicle speed using GNSS and inertial sensors. When a difference is detected between the two speed measurements, the value may be added to a distribution. When the distribution grows large enough, a standard deviation may be determined. When a difference between the two speed measurements is larger than a threshold percentage of the standard deviation, that may indicate that the difference between the two speed measurements is statistically significant. Embodiments disclosed herein may then apply a correction factor to the value of the radius of the wheel, such that the two speed measurements are in agreement. The overall accuracy of the speed measurement may thus be increased, and, for example, may result in a system that can operate with a reduced error, such as less than 1% error in accuracy, and the reduction or removal of static and calibration errors.

In one example, to increase the accuracy of the measurement of vehicle speed, a vehicle may include a wheel and a speed sensor for determining a first vehicle speed. The vehicle sensor may be integrated with the vehicle, and may determine the speed of the vehicle by measuring the rotation of the wheel. In some examples, the speed sensor may be a part of the anti-lock brake system of the vehicle. The vehicle may also include an inertial sensor, such as an accelerometer, gyroscope, and/or sensor for measuring wheel pulses of a wheel.

The example vehicle may further include a processor, configured to determine a second vehicle speed based on information from the inertial sensor(s) and information from a satellite based system. The processor may determine the second vehicle speed by receiving data from the satellite based system and one or more inertial sensors, and solving an algorithm based on the received data. The resulting speed may be the second vehicle speed.

In some examples, the second speed may be determined for the same point in time as the first vehicle speed. As such, the first and second vehicle speeds may be measurements of the same speed of the vehicle done through two different means. Alternatively, the first and second vehicle speed may be determined for two points in time that are within a threshold of each other (e.g., within 1 second). Other arrangements are possible as well.

After the first and second vehicle speeds are determined, a difference may be calculated. This difference may be termed a "delta." A plurality of deltas may be calculated over time and stored to develop a distribution. The distribution may then be used to determine that the difference between the first and second vehicles speeds is statistically significant.

But first, some examples may require that one or more preconditions be met before a delta can be added to the distribution. For instance, before a delta may be added to the distribution the delta must be determined for a time in which (i) the acceleration of the vehicle is below a threshold acceleration, (ii) the torque acting on the powertrain is below a threshold torque, and (iii) the vehicle is on a flat surface (i.e., not on a sloped road). If these preconditions are met, the measured delta may be added to the distribution.

Once the distribution contains a sufficient number of deltas, a standard deviation (or "sigma") value may be calculated. Then, it may be determined whether a measured delta is greater than a threshold percentage of the sigma. As an example, a distribution of deltas may include 100 values determined over a period of several minutes. A sigma may be calculated, and compared to a most recent delta. If the most recent delta is greater than 100% of sigma, that may indicate that the most recent delta is one standard deviation away from a predicted or expected value. In that case, the most recent delta may be termed statistically significant, and corrective measures may be taken.

The corrective measures may include applying a correction factor to a value of the radius of the wheel. The correction factor may be determined based on the distribution of deltas, the sigma, and/or one or more other values. In some examples, the correction factor may be determined such that when it is applied to the value of the radius of the wheel, the first vehicle speed measured by the speed sensor is brought in line with the second vehicle speed.

The stored distribution of deltas and sigma may then be reset, allowing the process of measuring vehicle speeds, determining a plurality of deltas and sigma, and applying a correction factor to restart.

I. Example Vehicle

Figure 1B:
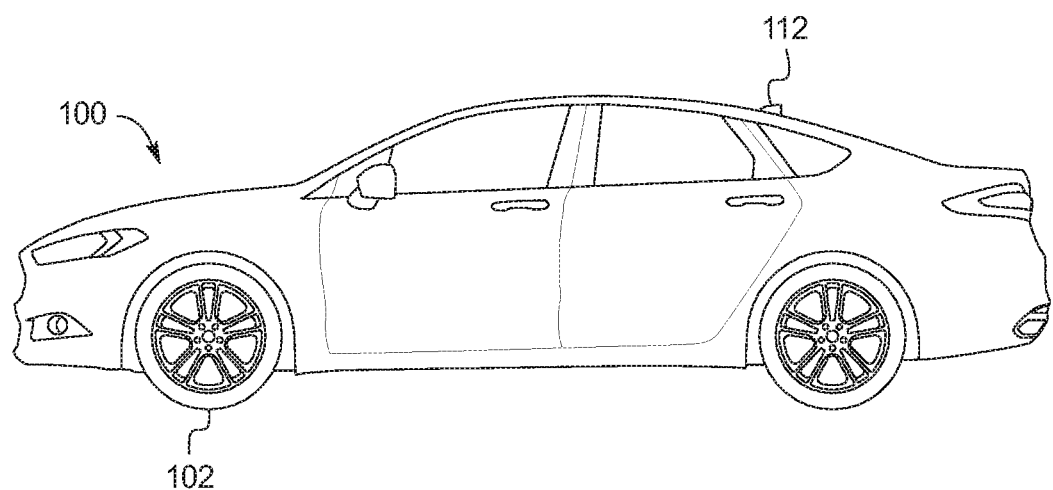
FIG. 1B illustrates an example side view of the vehicle of FIG. 1A according to embodiments of the present disclosure.

FIGS. 1A and 1B illustrate two views of an example vehicle 100 according to embodiments of the present disclosure. FIG. 1A shows a top down view, while FIG. 1B shows a side view. The vehicle 100 may be a standard gasoline powered vehicle, a hybrid vehicle, an electric vehicle, a fuel cell vehicle, and/or any other mobility implement type of vehicle. The vehicle 100 may include parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes four wheels 102, a speed sensor 104, an inertial sensor 106, a processor 110, and an antenna 112. Vehicle 100 may also include one or more components described below with respect to FIG. 2.

The wheel 102 may be any standard or custom wheel configured for operation with vehicle 100. Wheel 102 may have a wheel radius, rolling radius, or other metric stored and/or used by one or more systems of vehicle 100. For example, a radius of wheel 102 may be used in combination with speed sensor 104 to determine a speed of vehicle 100.

Speed sensor 104 may be a wheel speed sensor configured to detect a number of revolutions of wheel 102. In practice, this may take the form of an optical sensor or a magnetic sensor, for example. Speed sensor 104 may be separate from or integrated with one or more components of vehicle 100, such as the anti-lock brake system, wheel, or powertrain.

Inertial sensor 106 may be any of the sensors described herein, configured to detect one or more inertial metrics of vehicle 100. For instance, inertial sensor 106 may be an accelerometer, and may be configured to detect changes in the acceleration of vehicle 100. The measured changes may be used to determine an acceleration and/or speed of vehicle 100.

Processor 110 (described in more detail below) may be configured to carry out one or more actions, steps, blocks, or methods described herein. Processor 110 may be separate from or integrated with the systems of vehicle 100.

Antenna 112 may be coupled to or connected to one or more systems and modules described herein, such as processor 110, on-board computing platform 202, communication module 206, and GPS module 220.

II. Example Electronics

Figure 2:
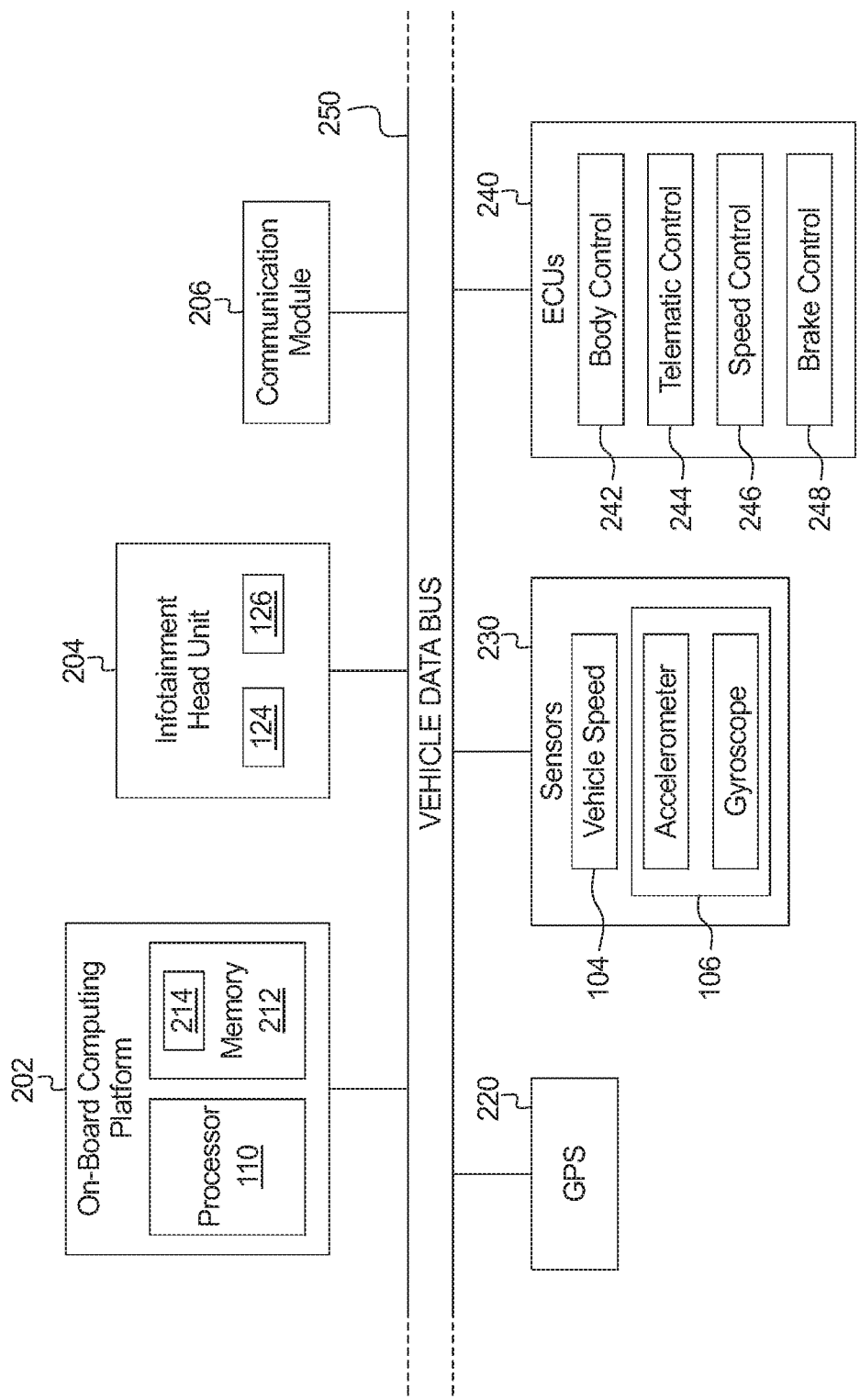
FIG. 2 illustrates an example block diagram of electronic components of the vehicle of FIGS. 1A and 1B.

FIG. 2 illustrates an example block diagram 200 showing the electronic components of an example vehicle, such as vehicle 100. As illustrated in FIG. 2, the electronic components 200 include an on-board computing platform 202, an infotainment head unit 204, a communication module 206, a global positioning satellite (GPS) module 220, sensors 230, and electronic control units 240, all in communication with each other via vehicle data bus 250.

The on-board computing platform 202 includes a microcontroller unit, controller or processor 110 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

In some examples, the memory 212 may include a value of the radius of the wheel 214. This value 214 may be used by or modified by processor 110 and/or one or more other processors, systems, or devices. For instance, the infotainment head unit 204 may use the stored value 214 of the wheel radius to determine and/or display a vehicle speed, and in one or more calculations that are used to determine a vehicle fuel efficiency (i.e., mpg), distance to empty, or other vehicle metric.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 204 may provide an interface between the vehicle 100 and a user. The infotainment head unit 204 may include digital and/or analog interfaces (e.g., input devices and output devices) to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 204 includes hardware (e.g., a processor or controller, memory, storage, etc.) and software (e.g., an operating system, etc.) for an infotainment system of vehicle 100 (such as SYNC® and MyFord Touch® by Ford®, Entune® by Toyota®, IntelliLink® by GMC®, etc.). In some examples the infotainment head unit 204 may share a processor with on-board computing platform 202. Additionally, the infotainment head unit 204 may display the infotainment system on, for example, the center console display 108.

Communication module 206 in FIG. 2 may include one or more wired or wireless network interfaces to enable communication between the vehicle 100 an one or more external systems or devices. In the illustrated example of FIG. 2, the communication module 206 may include one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the communication module 206 may include a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

Communication module 206 may be coupled to, connected, to or otherwise may make use of antenna 112 for communication via the processes and protocols described above.

Global Positioning System (GPS) module 220 may be configured to receive, decode, and/or otherwise process GPS data. This data may be used to determine a vehicle position, speed, and/or one or more other vehicle metrics. GPS module 220 may be a separate from, or may be integrated with one or more other systems, modules, and devices disclosed herein.

The sensors 230 may be arranged in and around the vehicle 100 to monitor properties of the vehicle 100 and/or an environment in which the vehicle 100 is located. One or more of the sensors 230 may be mounted on the outside of vehicle 100 to measure properties around an exterior of the vehicle 100. Additionally or alternatively, one or more of the sensors 230 may be mounted inside a cabin of the vehicle 100 or in a body of the vehicle 100 (e.g., an engine compartment, wheel wells, etc.) to measure properties in an interior of the vehicle 100. For example, the sensors 230 may include a vehicle speed sensor 104 and one or more inertial sensors 106.

Vehicle speed sensor 104 may include a sensor configured to detect a number of revolutions per time period (i.e., revolutions per minute). This value may correspond to the speed of vehicle 100, which may be determined, for instance, by multiplying the rate of wheel revolutions by the circumference of the wheel. In some embodiments, vehicle speed sensor 104 is mounted on vehicle 100. Vehicle speed sensor 104 may directly detect a speed of vehicle 100, or may indirectly detect the speed (e.g., by detecting a number of wheel revolutions).

Inertial sensors 106 may include one or more accelerometers and/or gyroscopes. These inertial sensors may detect one or more forces acting on vehicle 100, which may be used to determine a speed. Other inertial sensors may be used in addition to or instead of an accelerometer or gyroscope.

Sensors 230 may also include odometers, tachometers, pitch and yaw sensors, wheel speed sensors, magnetometers, microphones, tire pressure sensors, biometric sensors and/or sensors of any other suitable type.

The ECUs 240 may monitor and control the subsystems of the vehicle 100. For example, the ECUs 240 may be discrete sets of electronics that include their own circuit(s) (e.g., integrated circuits, microprocessors, memory, storage, etc.) and firmware, sensors, actuators, and/or mounting hardware. The ECUs 240 may communicate and exchange information via a vehicle data bus (e.g., the vehicle data bus 250). Additionally, the ECUs 240 may communicate properties (e.g., status of the ECUs 240, sensor readings, control state, error and diagnostic codes, etc.) to and/or receive requests from each other. For example, the vehicle 100 may have seventy or more of the ECUs 240 that are positioned in various locations around the vehicle 100 and are communicatively coupled by the vehicle data bus 250. In the illustrated example, the ECUs 240 include a body control 242, a telematic control 244, a speed control 246, and a brake control 248.

The body control unit 242 may controls one or more subsystems throughout the vehicle 100, such as power windows, power locks, an immobilizer system, power mirrors, etc. For example, the body control module 242 may includes circuits that drive one or more of relays (e.g., to control wiper fluid, etc.), brushed direct current (DC) motors (e.g., to control power seats, power locks, power windows, wipers, etc.), stepper motors, LEDs, etc.

The telematic control unit 244 may control tracking of the vehicle 100, for example, utilizing data received by the GPS receiver 220 of the vehicle 100, alone or in combination with information from one or more other sensors, modules, or systems. The speed control unit 246 may receive a signal from one or more systems or devices of vehicle 100 to autonomously control a speed at which the vehicle 100 travels. The brake control unit 248 may receive a signal from one or more systems or devices of vehicle 100 to autonomously operate brakes of the vehicle 100.

The vehicle data bus 250 may communicatively couple the various modules, systems, and components described with respect to FIG. 2. In some examples, the vehicle data bus 250 may includes one or more data buses. The vehicle data bus 250 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

III. Example Flowcharts

Figure 3:
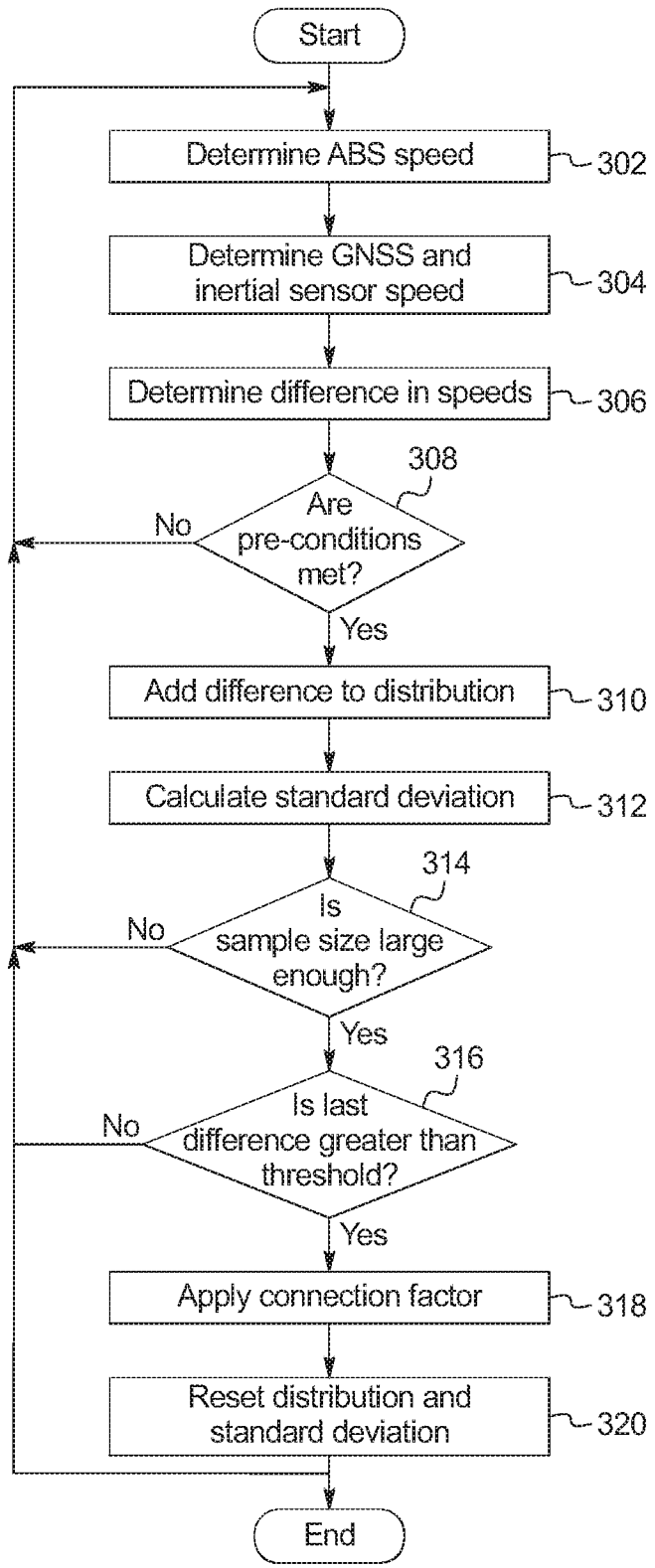
FIG. 3 illustrates a flowchart of an example method according to embodiments of the present disclosure.
Figure 4:
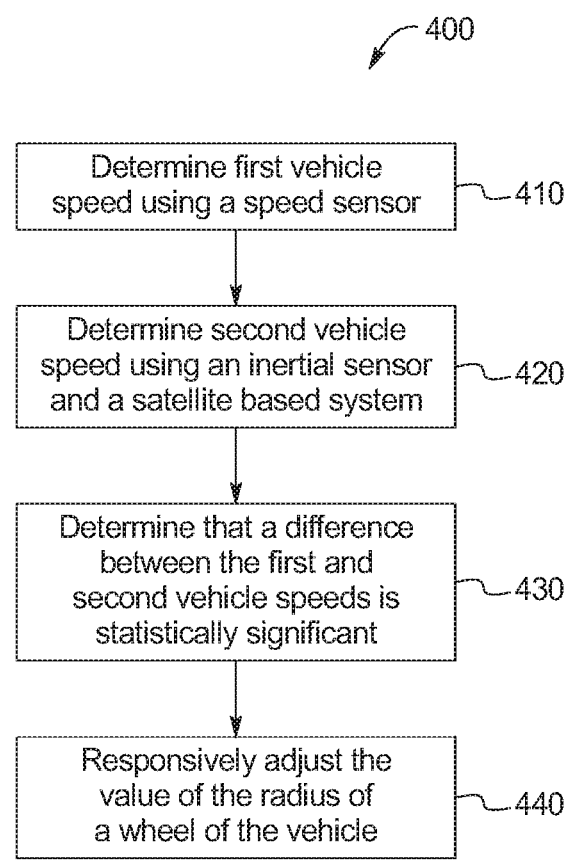
FIG. 4 illustrates a flowchart of another example method according to embodiments of the present disclosure

FIGS. 3 and 4 illustrate flowcharts of example methods 300 and 400 according to embodiments of the present disclosure. Methods 300 and 400 may provide increased accuracy in the measurement of a vehicle speed. The flowcharts of FIGS. 3 and 4 are representative of machine readable instructions that are stored in memory (such as memory 212) and may include one or more programs which, when executed by a processor (such as processor 110) may cause vehicle 100 to carry out one or more functions described herein. While the example program is described with reference to the flowcharts illustrated in FIGS. 3 and 4, many other methods for carrying out the functions described herein may alternatively be used. For example, the order of execution of the blocks may be rearranged, blocks may be changed, eliminated, and/or combined to perform methods 300 and 400. Further, some blocks may be performed in tandem with each other, although they are shown sequentially in FIGS. 3 and 4. And because methods 300 and 400 are disclosed in connection with the components of FIGS. 1-2, some functions of those components will not be described in detail below.

Initially, at block 302, method 300 includes determining the (anti-lock brake system) ABS speed. As described above, a speed sensor may be integrated with the ABS, in order to provide the vehicle with a signal to determine the vehicle speed. At block 304, method 300 may include determining the GNSS and inertial sensor speed. This block may involve the processor receiving information from one or more satellites and inertial sensors, to determine a vehicle speed separate from the determined ABS speed. Other satellite based systems and inertial sensors may be used.

At block 306, method 300 may include determining a difference in speeds between the ABS speed (first vehicle speed) and GNSS/inertial sensor speed (second vehicle speed). This difference may be called a delta, and may be calculated constantly or near constantly, based on the refresh rate or update rate of the speed sensor and received data.

Block 308 of method 300 may include determining whether one or more preconditions are met. If one or more preconditions are not met, the measured difference (delta) may be erased, removed, or otherwise discarded. Alternatively, the preconditions may be required before a delta is determined in the first place. The preconditions may ensure consistency and accuracy of measurement. As described above, the preconditions may include that the acceleration is below a threshold acceleration, the torque is below a threshold torque, and that the vehicle is on a flat surface. The acceleration may be measured by an accelerometer, and may be required to be below a threshold so that no large changes in speed occur during the measurement of the vehicle speeds. In one example, the threshold acceleration is an increase or decrease of one mph/sec. The torque threshold may be used to ensure that the vehicle is not accelerating or decelerating. Torque acting on the power train may be determined by a torque sensor, which may be part of a powertrain control module. A third precondition may include that the vehicle is on a flat or relatively flat surface. For example, one or more pitch or yaw sensors, or a gyroscope may be used to determine whether the slope of the vehicle is above a threshold. An example threshold may be that the slop of the vehicle is below two degrees. One or more other preconditions may be used as well, and may include any metric that can be used to ensure the accuracy of the speed measurements.

If the preconditions are not met, method 300 may include restarting the method at block 302. However if the preconditions are met, method 300 may include block 310. Block 310 may include adding the measured difference (delta) to a distribution. The distribution may include tens, hundreds, or thousands of data points corresponding to deltas determined over time.

At block 312, method 300 may include calculating a standard deviation of the distribution. Then, at block 314, method 300 may include determining whether the sample size of the distribution is large enough. This threshold may be predetermined, or dynamically changed based on deltas measured over the course of time. The sample size threshold may be any size, for example as small as 10 samples, or as large as hundreds or thousands of samples. Smaller or larger sample sizes are included as well.

If the sample size is not large enough (i.e., there are not enough deltas in the distribution) then method 300 may return to block 302 in order to measure the speed of the vehicle and add additional deltas to the distribution.

If the distribution sample size is large enough, then block 316 may include determining whether the most recent delta is larger than a threshold percentage of the calculated standard deviation. In effect, block 316 determines whether the most recent difference in speeds of the vehicle, measured by the two techniques, is large enough that corrective action should be taken. Block 316 may determine when the determined deltas are off by a large enough margin to warrant correction. If the most recent delta is not large enough, then the method may return to block 302 to determine additional deltas.

But if the most recent delta is larger than the threshold percentage of the standard deviation, method 300 may include block 318. Block 318 may include applying a correction factor. The correction factor may be determined based on the distribution of deltas, the determined standard deviation, or one or more other values. In some examples, the correction factor is applied to a stored value of the radius of the wheel of the vehicle. The wheel radius value may be used by various systems and modules in the vehicle to determine one or more values (speed, mpg, distance traveled, etc.). By applying a correction factor to this value, the first vehicle speed and the second vehicle speed may be brought into alignment.

Block 320 of method 300 may involve resetting the distribution and standard deviation. In practice, this may include discarding the calculated deltas in the distribution, and resetting the standard deviation to zero.

FIG. 4 illustrates an example method 400. At block 410, method 400 may include determining a first vehicle speed using a speed sensor. This block may be carried out in any manner, such as those described herein with reference to speed sensors. Further, the speed sensor may be any sensor described herein such as an optical or magnetic sensor.

At block 420, method 400 may include determining a second vehicle speed using an inertial sensor and a satellite based system. In some examples, the first and second vehicle speeds may be determined at the same or nearly the same time. Further, the first and second speeds may be determined continuously or near continuously over a time period.

At block 430, method 400 may include determining that a difference between the first and second vehicle speeds is statistically significant. This determination may take place after a sufficient number of first and second vehicle speed shave been determined. Further, this determination may include determining that a most recent difference between the first and second vehicle speeds is greater than a threshold.

Then, at block 440, method 400 may include responsively adjusting the value of the radius of a wheel of the vehicle. The value of the radius of the wheel may be used to determine the first and/or second vehicle speeds, and as such adjusting this value may change a value used in the determination of the first and/or second vehicle speeds.

In some examples, block 440 of method 400 may alternatively include adjusting or modifying one or more other stored values, such as a wheel diameter or circumference. However it should be noted that any modification to the value of the radius also modifies any determination of the vehicle diameter and circumference.

In some examples, method 400 may additionally or alternatively include one or more blocks, such as those described with reference to FIG. 3.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a wheel;
   a speed sensor for determining a first vehicle speed, the first vehicle speed being determined based on a wheel radius value;
   an inertial sensor: and
   a processor for:
      determining a second vehicle speed based on information from the inertial sensor and information from a satellite based system;
      determining that a difference between the first and second vehicle speeds is statistically significant, further comprising:
         determining a distribution of data points corresponding to differences between the first and second vehicle speeds over time;

determining a standard deviation of the distribution of data points; and determining that a particular data point is greater than a threshold percentage of the standard deviation; and responsively adjusting the wheel radius value, further comprising:

determining a correction factor based on the distribution of data points and the standard deviation to align the first vehicle speed and the second vehicle speed; and determining an adjusted wheel radius value by adding the correction factor to a stored wheel radius value.

2. The vehicle of claim 1, wherein the first and second vehicle speeds are determined or a same point in time.

3. The vehicle of claim 1, wherein determining the distribution of data points comprises determining a plurality of data points when certain preconditions are met, the preconditions comprising:

an acceleration of the vehicle is below a threshold acceleration;

a torque acting on a powertrain of the vehicle is below a threshold torque; and a slope of a road the vehicle is on is below a threshold slope.

4. The vehicle of claim 1, wherein determining that the particular data point is greater than the threshold percentage of the standard deviation comprises determining that a most recent data point is greater than the threshold percentage of the standard deviation.

5. The vehicle of claim 1, wherein responsive to adjusting the wheel radius value, resetting, by the processor, the distribution of data points representing differences between the first and second vehicle speeds is reset.

6. A method for improving accuracy in the measurement of vehicle speed comprising:

determining a first vehicle speed using a speed sensor based on a vehicle wheel radius value;

determining a second vehicle speed using an inertial sensor and a satellite based system;

determining that a difference between the first and second vehicle speeds is statistically significant, further comprising:

determining a distribution of data points corresponding to differences between the first and second vehicle speeds over time;

determining a standard deviation of the distribution of data points; and determining that a particular data point is greater than a threshold percentage of the standard deviation; and responsively adjusting the vehicle wheel radius value, further comprising:

determining a correction factor based on the distribution of data points and the standard deviation to align the first vehicle speed and the second vehicle speed; and determining an adjusted wheel radius value by adding the correction factor to a stored vehicle wheel radius value.

7. The method of claim 6, wherein the first and second vehicle speeds are determined for a same point in time.

8. The method of claim 6, wherein determining the distribution of data points comprises determining a plurality of data points when certain preconditions are met, the preconditions comprising:

an acceleration of the vehicle is below a threshold acceleration;

a torque acting on a powertrain of the vehicle is below a threshold torque; and a slope of a road the vehicle is on is below a threshold slope.

9. The method of claim 6, wherein determining that the particular data point is greater than the threshold percentage of the standard deviation comprises determining that a most recent data point is greater than the threshold percentage of the standard deviation.

10. The method of claim 6, wherein responsive to adjusting the vehicle wheel radius value, the distribution of data points representing differences between the first and second vehicle speeds is reset.

11. A vehicle comprising:

a wheel;

a speed sensor for determining a first vehicle speeds, the first vehicle speed being determined based on a wheel radius value;

an inertial sensor; and a processor for:

determining a second vehicle speed based on information from the inertial sensor and information from a satellite based system, the first and second vehicle speeds being determined for a same point in time;

determining that a difference between the first and second vehicle speeds is statistically significant by:

determining a distribution of data points corresponding to differences between the first and second vehicle speeds over time;

determining a standard deviation of the distribution of data points; and determining that a particular data point is greater than a threshold percentage of the standard deviation; and responsively adjusting the wheel radius value, further comprising:

determining a correction factor based on the distribution of data points and the standard deviation to align the first vehicle speed and the second vehicle speed; and determining an adjusted wheel radius value by adding the correction factor to a stored wheel radius value; and resetting the distribution of data points representing differences between the first and second vehicle speeds.

12. The vehicle of claim 11, wherein determining the distribution of data points comprises determining a plurality of data points when certain preconditions are met, the preconditions comprising:

an acceleration of the vehicle is below a threshold acceleration;

a torque acting on a powertrain of the vehicle is below a threshold torque; and a slope of a road the vehicle is on is below a threshold slope.

13. The vehicle of claim 11, wherein determining that the particular data point is greater than the threshold percentage of the standard deviation comprises determining that a most recent data point is greater than the threshold percentage of the standard deviation.

14. A vehicle comprising:

a wheel;

a speed sensor for determining a first vehicle speed, the first vehicle speed being determined based on a wheel radius value;

an inertial sensor: and a processor for:

determining a second vehicle speed based on information from the inertial sensor and information from a satellite based system;
determining that a difference between the first and second vehicle speeds is statistically significant, further comprising:
  determining a distribution of data points corresponding to differences between the first and second vehicle speeds over time, wherein determining the distribution of data points comprises determining a plurality of data points when certain preconditions are met, the preconditions comprising:
    an acceleration of the vehicle is below a threshold acceleration;
    a torque acting on a powertrain of the vehicle is below a threshold torque; and
    a slope of a road the vehicle is on is below a threshold slope;
  determining a standard deviation of the distribution of data points; and
  determining that a particular data point is greater than a threshold percentage of the standard deviation; and
responsively adjusting the wheel radius value.

15. A method for improving accuracy in the measurement of vehicle speed comprising:
determining a first vehicle speed using a speed sensor based on a vehicle wheel radius value;
determining a second vehicle speed using an inertial sensor and a satellite based system;
determining that a difference between the first and second vehicle speeds is statistically significant, further comprising:
  determining a distribution of data points corresponding to differences between the first and second vehicle speeds over time, wherein determining the distribution of data points comprises determining a plurality of data points when certain preconditions are met, the preconditions comprising:
    an acceleration of the vehicle is below a threshold acceleration;
    a torque acting on a powertrain of the vehicle is below a threshold torque; and
    a slope of a road the vehicle is on is below a threshold slope;
  determining a standard deviation of the distribution of data points; and
  determining that a particular data point is greater than a threshold percentage of the standard deviation; and
responsively adjusting the vehicle wheel radius value.

16. A vehicle comprising:
a wheel;
a speed sensor for determining a first vehicle speeds, the first vehicle speed being determined based on a wheel radius value;
an inertial sensor; and
a processor for:
determining a second vehicle speed based on information from the inertial sensor and information from a satellite based system, the first and second vehicle speeds being determined for the a same point in time;
determining that a difference between the first and second vehicle speeds is statistically significant by:
  determining a distribution of data points corresponding to differences between the first and second vehicle speeds over time, wherein determining the distribution of data points comprises determining a plurality of data points when certain preconditions are met, the preconditions comprising:
an acceleration of the vehicle is below a threshold acceleration;
a torque acting on a powertrain of the vehicle is below a threshold torque; and
a slope of a road the vehicle is on is below a threshold slope;
determining a standard deviation of the distribution of data points; and
determining that a particular data point is greater than a threshold percentage of the standard deviation; and
responsively adjusting the wheel radius value and resetting the distribution of data points representing differences between the first and second vehicle speeds.

* * * * *